Aug. 13, 1968   R. BURNSIDE   3,396,995
BALL-COCK SHANK
Filed May 14, 1964

INVENTOR.
RALPH BURNSIDE
BY
R. Wilson Corder
ATTORNEY

United States Patent Office 3,396,995
Patented Aug. 13, 1968

3,396,995
BALL-COCK SHANK
Ralph Burnside, P.O. Box 633, Duluth, Ga. 30136
Filed May 14, 1964, Ser. No. 367,354
4 Claims. (Cl. 285—330)

This invention relates to the plumbing arts, and more particularly to a new improved ball-cock (valve) shank, as commonly used in association with toilet tanks in performing a flushing function, although the invention is not so limited.

Heretofore, ball-cock valves have been installed in toilet tanks by inserting the tail or shank of the valve through a uniform hole provided in the bottom of the tank at the time of manufacture, and joining said shank-adapter member with a water supply pipe by passing a substantial lock-nut through which the pipe is passed, onto the threaded shank and into securing position against the bottom of the tank. This operation, while simple in its basic concepts, is often a trying one for several reasons.

In the first place, all ball-cock shanks, at least in this country, are made of a uniform diameter with relatively thin walls and a large opening to accommodate whatever size water supply pipe or pipes may be employed in a given locality. This means that the hole in the shank is generally larger than the water pipe, which in turn dictates that the latter must be exactly on center with the shank at the time the fitting is tighened, as otherwise a leak will result. Hence the plumber must spend from fifteen minutes to a couple of hours in experimenting to get this exact centering, and even then he often must go back and start over again to cure a leak at this point that has developed over night.

An object of this invention is to provide a shank connection that will cause a special water supply pipe to be automatically centered once it is placed therein.

Another object is to provide simplicity in such a device.

Another object is to provide a minimum of alteration of standard parts now on the market to effect this desired result.

A still further object is to provide cheapness of construction of a ball-cock shank and connector.

Another object is to provide a water-tight seal in such a device.

Another object is to make possible a minimum of parts to quickly and easily effect the desired connection and seal.

Another object is to provide a shank-connector with a lower or bottom surface that causes a washer to so adapt itself and conform thereto as to effect a water-tight seal when tightening pressure is applied to the assembly.

These and other objects made apparent during the further progress of this specification are accomplished by means of the instant invention, a full and complete understanding of which is facilitated by reference to the drawing herein, in which.

Figure 1:
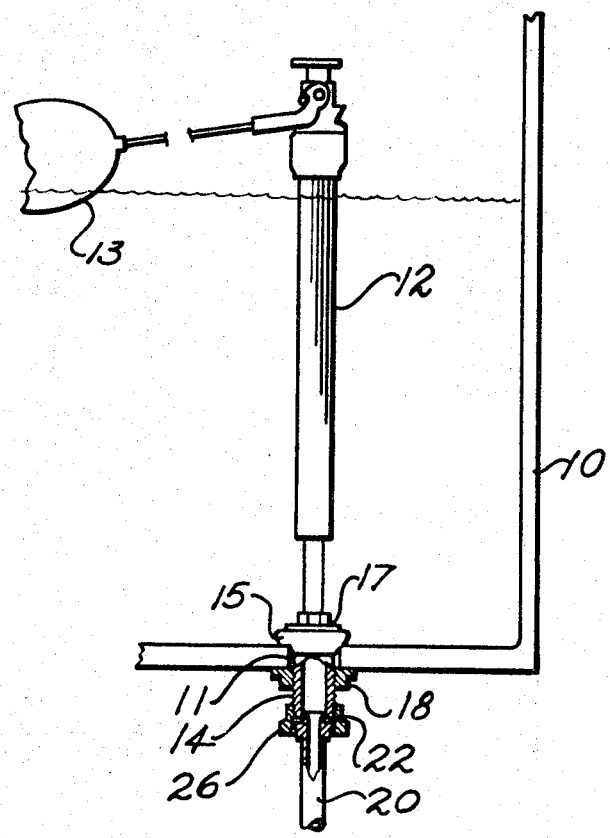
FIG. 1 is a side view partially in perspective and partly in cross-section, showing the shank-connection in assembled position on a toilet tank.

Referring now the the drawing, in which like numerals refer to corresponding elements or parts throughout the various figures thereof, 10 is a standard toilet tank having a circular aperture or opening formed in the bottom thereof, usually at the time of manufacture. Operatively disposed in said tank is a standard ball-cock valve 12 of conventional design, to which is connected a float 13. Said valve has a shank or tail portion 14 passed downwardly through 11, and insulated against leakage from inside the tank by large rubber sealer 15, which is held against upward movement on shaft or pipe 16 by fitting 17. A lock-nut 18 is disposed on shank 14 below 11, and when tightened, completes the valve mounting.

Attention is now directed to the bottom or base of shank 14, which is provided with a plurality of small concentric grooves 19 to provide continuous hollow rings at this point, the purpose and function of which will be made clear during the further progress of this specification.

A water supply pipe 20, preferably of a diameter nearly approximating the interior of shank 14, is provided to bring water into tank 10, said pipe being flared at its outer peripheral edge 21 both to effect a better fit, and to retain on the end of the pipe a washer 22 formed of lead or other relatively soft metal or material and having a diameter approximating that of the threaded outer edge of shank 14. A fitting 23 is formed integral with pipe 20 adjacent the end thereof, said fitting having a stepped portion 24 to receive the underlying ledge section 25 of a jam nut 26.

Figure 2:
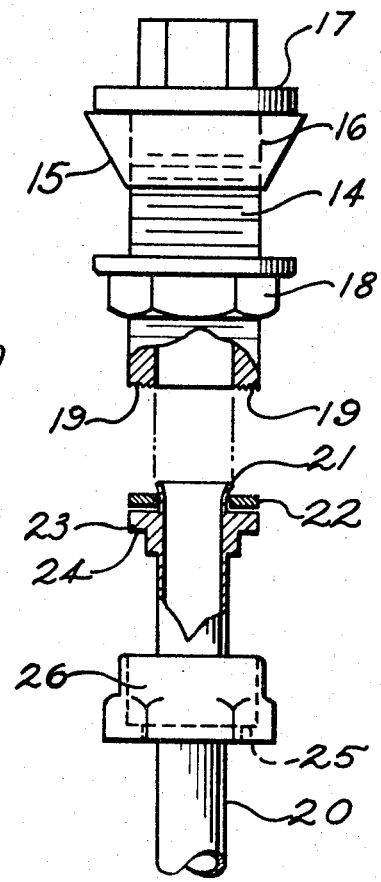
FIG. 2 is an enlarged fragmentary view, partially in cross-section, on a scale of approximately 2–1, showing the connector in fully assembled and tightened position.
Figure 3:
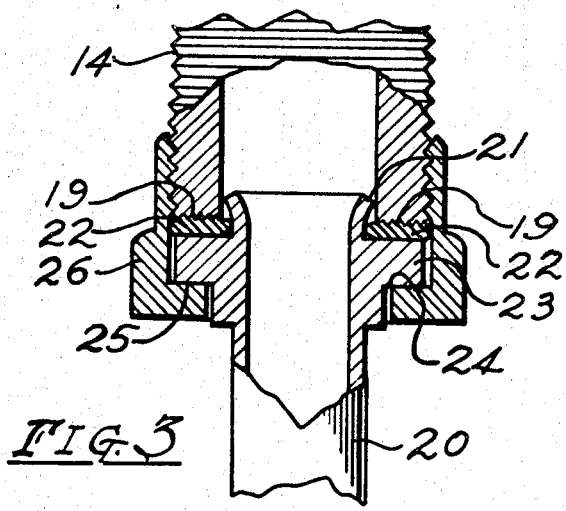
FIG. 3 is an enlarged, exploded view of the principal elements of FIG. 1, said view being both in perspective and in section in parts.

The operation of the instant device is as follows: Ball-cock valve 12 having been firmly installed in tank 11 in conjunction with rubber element 15 and lock-nut 18, with shank 14 protruding below the bottom of the tank; water pipe 20 is inserted into the shank and jam nut 26 brought into threaded engagement with said shank. By making the exterior diameter of the pipe approximate that of the opening in the interior of the shank, a good centering immediately and almost automatically takes place, and as the jam nut is tightened, a leak-proof joint begins to form. This result is facilitated by the action of lead washer 22, which increasingly distorts into grooves 19 (FIG. 2) to both center and seal the pipe in the shank at this point. This action results even if the pipe should be appreciably smaller than the shank as still happens in some cases, the rugged action of nut 26 with its surface 25 engaging and bearing on surface 24 of fitting 23, serving in its upward movement to force washer 22 into the grooves in the shank above, and thereby quickly and positively center the pipe, the washer having a diameter similar to that of the exterior of the pipe, and at its outer edge extending, if desired, a bit beyond the upper edge of fitting 23.

From the foregoing it is apparent that there has been shown and described herein a new and improved ball-cock (valve) shank connector that almost instantly effects a centering operation with the water supply pipe with which it is associated, thereby guaranteeing a water-tight seal the first time, and without the wasting of many man hours on this job as has been the case in the past.

While one form of the instant invention has been described in considerable detail, no limitation is intended or implied thereby, it being apparent that various modifications, changes, reconstructions, alterations and the like may be resorted to without departing from the scope of the appended claims, which are to be accorded a construction fairly in keeping with the contribution to the art.

I claim:

1. In a ball-cock valve assembly of the type utilized in a toilet tank, the combination of a water supply pipe for connection at one of its ends to a source of water pressure, said water supply pipe including an exterior annular flange extending thereabout, said flange being displaced from the other end of said pipe, a hollow cylindrically shaped externally threaded shank having an inside diameter at least as large as the outside diameter of said water supply pipe, one of the ends of said shank forming an annular surface disposed perpendicular to the longitudinal axis thereof and defining a plurality of concentric grooves therein, a deformable washer disposed around said water supply pipe between its said other end and its said exterior annular flange, a jam nut including an internally threaded portion and an inwardly stepped portion, said inwardly stepped portion engaging the exterior annular flange of said water supply pipe and said internally threaded portion engaging the external threads of said shank, whereby said one of the ends of said shank and said other end of said water supply pipe are urged toward each other and the grooves of said shank partially deform said deformable washer.

2. The invention of claim 1 wherein the exterior annular flange of said water supply pipe is of a thickness approximately equal to the annular surface of said one of the ends of said shank.

3. The invention of claim 1 wherein said other end of said water supply pipe is flared outwardly and extends inwardly of the said one of the ends of said shank.

4. The invention of claim 3 and further including a rubber sealer surrounding and fixedly secured to said shank for positioning inside said toilet tank and an internally threaded lock nut threadedly engaging the external threads of said shank and engaging the outer surface of said tank to compress said sealer against the internal surface of said tank.

References Cited

UNITED STATES PATENTS

| | | | |
|---|---|---|---|
| 302,101 | 7/1884 | Chase | 285—330 |
| 579,643 | 3/1897 | Gleason | 285—330 |
| 1,096,237 | 5/1914 | Gehrke | 137—442 |
| 1,901,633 | 3/1933 | Clemmons | 137—436 |
| 1,906,826 | 5/1933 | Smith et al. | |
| 2,026,916 | 1/1936 | Smith | 251—46 |
| 2,195,797 | 4/1940 | Groeniger | 137—444 X |
| 2,354,538 | 7/1944 | Parker | 285—354 |
| 2,631,049 | 3/1953 | McGillis et al. | 285—354 |
| 3,120,857 | 2/1964 | Fischer et al. | 137—592 |

WILLIAM F. O'DEA, *Primary Examiner.*

DAVID R. MATTHEWS, *Assistant Examiner.*